Nov. 4, 1924.
W. TAYLOR ET AL
1,514,352
METHOD AND MEANS OF MOUNTING LENSES
Filed July 6, 1921   4 Sheets-Sheet 3
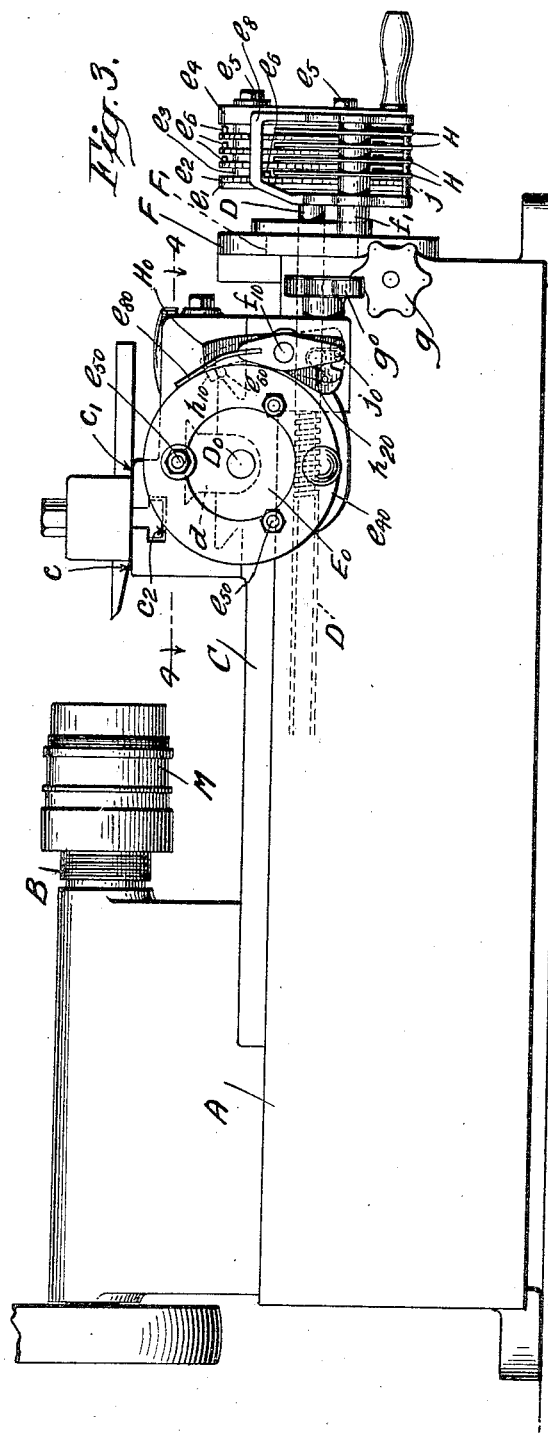
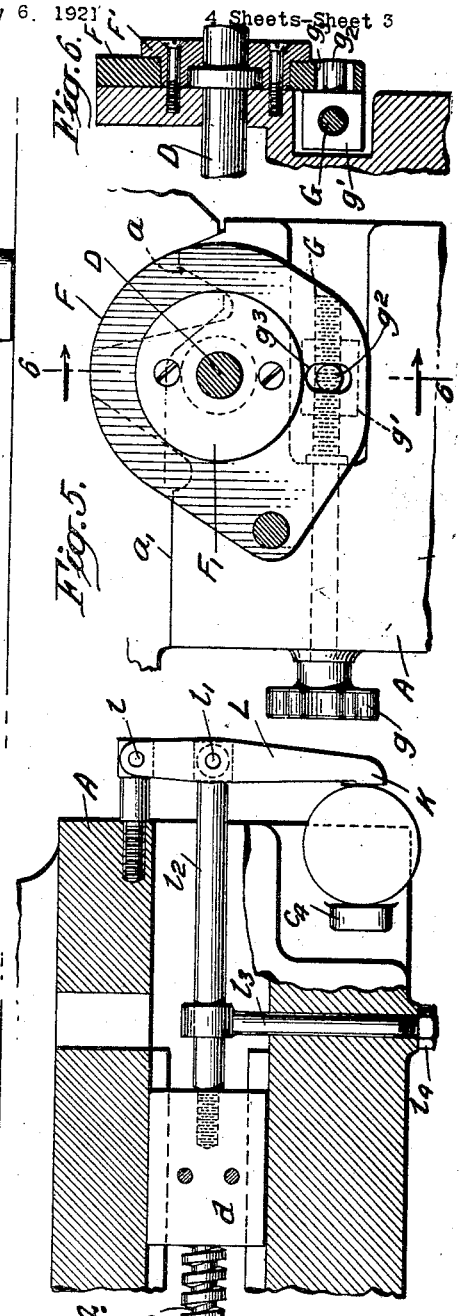
INVENTOR
William Taylor
Arthur Warmisham
By Arthur L. Kent
Their ATTORNEY Nov. 4, 1924.  1,514,352
W. TAYLOR ET AL
METHOD AND MEANS OF MOUNTING LENSES
Filed July 6, 1921   4 Sheets-Sheet 4
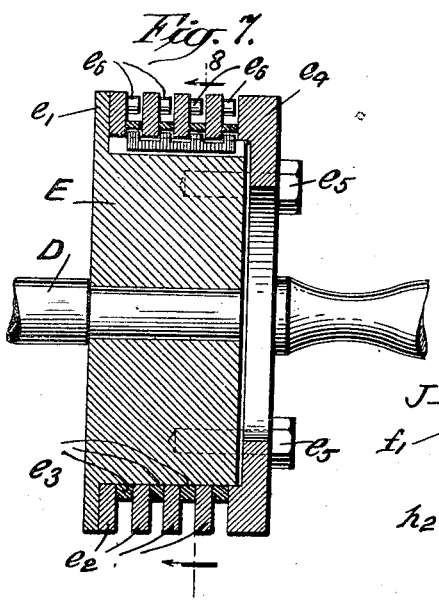
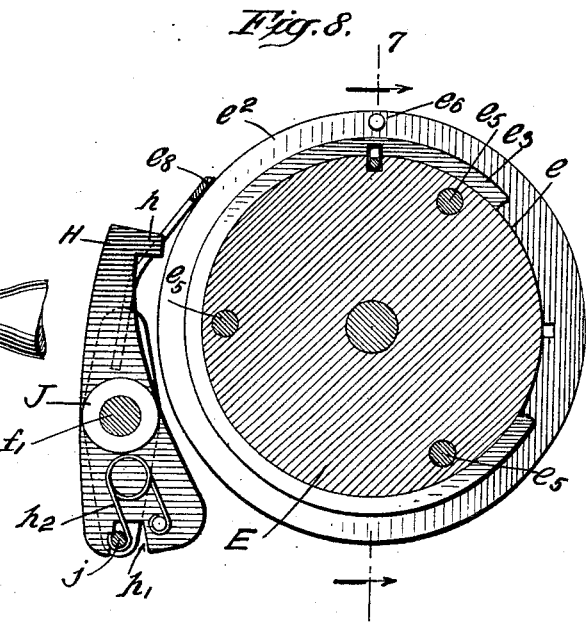
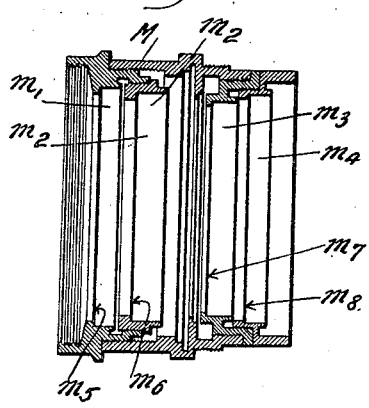
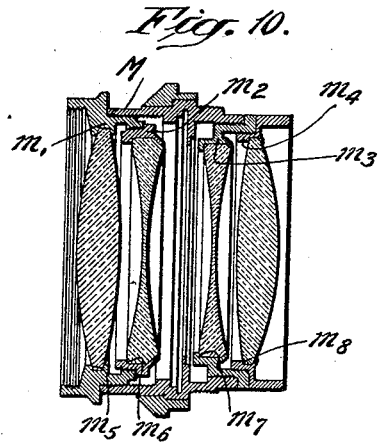
INVENTOR
William Taylor
Arthur Warmisham
By Arthur L. Kent
their ATTORNEY Patented Nov. 4, 1924.

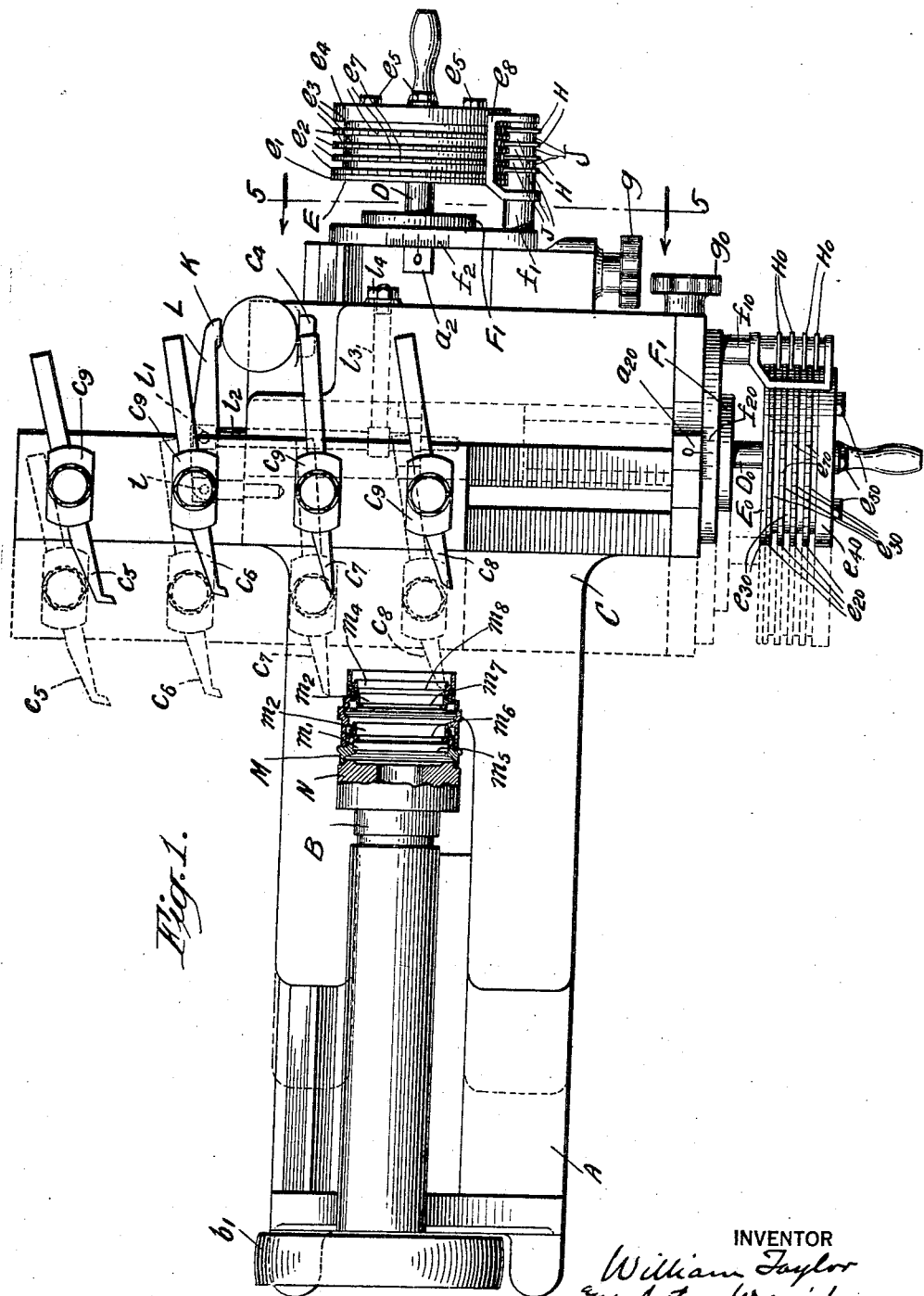

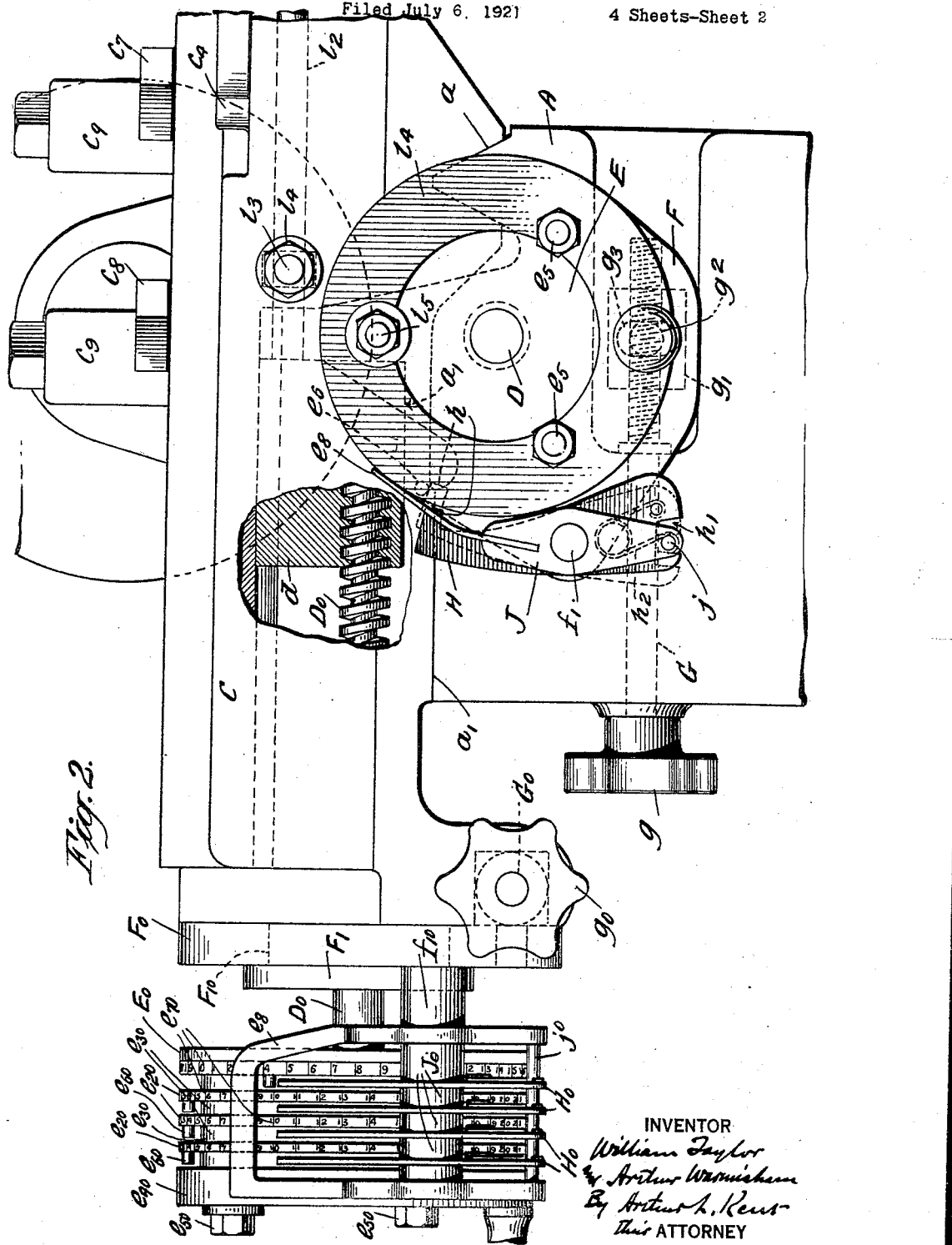

1,514,352

UNITED STATES PATENT OFFICE.

WILLIAM TAYLOR AND ARTHUR WARMISHAM, OF LEICESTER, ENGLAND.

METHOD AND MEANS OF MOUNTING LENSES.

Application filed July 6, 1921. Serial No. 482,845.

*To all whom it may concern:*

Be it known that we, WILLIAM TAYLOR and ARTHUR WARMISHAM, subjects of the King of Great Britain, both residing at Stoughton Street Works, Leicester, in the county of Leicester, England, have invented certain new and useful Improvements in Methods and Means of Mounting Lenses, fully described and represented in the following specification and the accompanying drawings, forming a part of the same.

This invention relates to the mounting of a plurality of lenses forming one optical system, and particularly to photographic, microscopic and similar lenses in which it is of importance that the separations and centering of the component glasses (which separations should vary, as between one complete lens and another, with variations of the thickness or focal length of the components) should be determined and effected with precision.

The object of the invention is to provide an improved method and means of effecting such accurate mounting of lenses, applicable particularly to the manufacture of lenses in quantities, with a view to accommodating such differences of diameter, thickness, refractive index, and curvature, as normally exist among a number of lenses manufactured nominally to the same specification.

It has been customary, in making lenses of the kind mentioned, to mount them in cells having internal shoulders, hereinafter termed abutments, against which the component glasses are secured to place each set of lenses in its mounting with the abutments separated as prescribed by calculation for a normal lens, to test the assembled lens optically, and then to make modification in the positions of the various abutments as may, in the judgment of a skilled examiner, appear to be necessary. The cell and its abutment or their equivalent are hereinafter termed a setting.

Now according to this invention the settings of the component lenses are adjusted according to the departure from normal of their thickness, focal length and diameter or according to the departure from normal of any one or two of these characteristics. The normal separation of the abutments for any particular lens for example a lens as is shown in central longitudinal section in Figure 10 of the accompanying drawings, is calculated in the usual way, but the need of mounting the lenses for trial before making adjustment of the abutments is dispensed with, and instead, the thickness and focal length of each component lens is measured so as to determine its variations from the normal (or specified) thickness and focal length, and from schedules of corrections prepared for each kind of lens, is ascertained what departure from the normal positional relation of the abutments is necessary to obtain the correct results from each combination of component lenses.

In order to increase the accuracy of the determination of the focal length of an element or of the departure of the focal length from the normal, the element in question may be combined with a standard element of the opposite kind; for example a convergent element may be combined with a standard divergent element of longer focal length, which is adapted by a suitable device of glass and curvatures to form a combination correct for spherical and chromatic aberrations, and preferably having a focal length at least double that of the convergent element. By such means, variation from the normal in the focal length of the element under test can be determined accurately on an enlarged scale, which is at least 4 to 1, but which may be arranged to be 10 to 1.

Apparatus is provided by which the abutments in a mounting may be cut or adjusted to the positional relation so determined, and true to one common axis, and at the same time the bores of the settings may be cut or adjusted truly to such axis, and according to any variations from normal of the diameters of the lenses. These adjustments may be made either by chucking the mount with its settings complete in a lathe or like apparatus and performing the necessary operations upon the settings either successively or simultaneously; or, in cases where the design of the mounting admits of it, the various settings may be operated upon separately.

The schedule is prepared either mathematically or otherwise to give the variation in several elements such as air spaces, required to counteract, in its effect on the optical aberrations, the influence of abnormalities of thickness or focal length of component glasses.

The total variation in a particular ai space, necessitated by the abnormalities of all component lenses of the system, is the algebraic sum of the variations in this air space due to each lens separately, when these variations are small as should usually be the case in practice.

This system of dealing with the mounting of systems of lenses takes account, in the case of each component lens, of variations, both of refractive index and curvature.

The apparatus may have the form of a lathe and one form thereof is illustrated by the accompanying drawings wherein Figure 1 is a plan view, partly in section, showing the advance position of the slide rest and the tools in dotted line;

Figure 2 is an end elevation;

Figure 3 is a side elevation;

Figure 4 is a fragmentary plan view partly sectioned on the lines 4—4 of Figures 2 and 3;

Figure 5 is an end elevation sectioned on the line 5—5 of Figure 1;

Figure 6 is a fragmentary longitudinal section on the line 6—6 of Figure 5;

Figure 7 is a fragmentary longitudinal section on the line 7—7 of Figure 8 showing one of the drums and associated parts;

Figure 8 is a fragmentary transverse section on the line 8—8 of Figure 7 showing one of the drums and one of the stops; and Figure 9 is a central longitudinal section of a lens mounting, and Figure 10 a central longitudinal section of a lens of a kind to which this invention may be applied.

As shown the apparatus comprises a bed A with a work spindle B mounted thereon in the usual manner and driven by a belt (not shown) passing over a pulley $b^1$ fixed on the spindle. Sliding upon the bed A on ways $a$, $a^1$ is a compound slide rest C having a surface $c$, $c^1$, on which a number of turning tools $c^5$, $c^6$, $c^7$, $c^8$ may be clamped in a known manner by means of tool posts $c^9$ fitted in the T slot $c^2$. The members of the slide rest are actuated by screws D, D° in a known manner, and for the purpose of positioning each of the various turning tools, both longitudinally and transversely and in both normal and abnormal positions, for the purpose of this invention, the screws may be provided with an arrangement of stops as follows:—

Upon the outer end of the screw D is fixed a drum E having a cylindrical exterior $e$ and a flange $e^1$. Upon the cylindrical exterior $e$ are fitted revolubly a number of rings $e^2$ and a number of spacing rings $e^3$ which separate the rings $e^2$ and are feathered to the drum E so that any ring $e^2$ may be turned without turning its neighbours and clamp ring $e^4$ actuated by bolts $e^5$ may be used to clamp all the rings $e^2$ and $e^3$ against the flange $e^1$. Each of the rings $e^2$ is provided with a lateral projection $e^6$ and with graduations $e^7$ on its periphery adapted to be read against the edge of a reader $e^8$.

Upon one end of the bed A, is pivoted a plate F upon a pivot or bung $F^1$ concentric with the screw D, the plate F being adjustable rotationally thereon by means of a worm and wheel or, as shown, by means of a screw G with a hand wheel $g$, the screw G engaging a nut $g^1$ having a pin $g^2$ adapted to engage in a radial slot $g^3$ in the plate F. The periphery of the plate F is graduated at $f^2$ and a reader $a^2$ is carried by the frame A.

Fixed to and projecting from the plate F is a stud $f^1$, on which are mounted revolubly a series of stops H having projecting ends $h$ adapted to engage the lateral projections $e^6$ on the stop drum, and thereby to position the various tools. The stops H are spaced on the stud $f^1$ by means of suitable collars J, two of which serve also to carry the reader $e^8$ and a bar $j$ adapted to engage notches $h^1$ in the bottom edges of the stops $h$ so as to suitably limit their rotation on the stud $f^1$.

Springs $h^2$ are provided to turn the stops H out of engagement with the lateral projections $e^6$, these springs being further compressed when the operator, with the aid of his fingers, pushes the stops H into engagement.

Upon the outer end of the screw D° is fixed a drum E° precisely like the drum E and provided with the same associated parts which are identified in the drawings by the same reference characters as the corresponding parts associated with the drum E, a zero being added to each character. Near one end of the slide rest C is a reader $c^3$ similar to the reader $a^2$, and upon this end of the slide rest C is pivoted a plate F° precisely similar to the plate F and provided with associated parts like those associated with the plate F and identified in the drawings by the same reference characters as those parts, a zero being added to each character.

When in use the various tools required, for example $c^5$, $c^6$, $c^7$, $c^8$ are fastened to the slide rest C, and the rings $e^2$, $e^{20}$ are adjustably set and clamped to their stop drums E, E° so that the normal operative position of each tool, both longitudinally and transversely, is determined by the setting of one of the rings $e^2$ and one of the rings $e^{20}$ and their lateral projections $e^6$, $e^{60}$, the plates F, F° being at this time set to the zero of its graduations.

By aid of these devices, the various settings in a lens mounting, or succession of such mountings, may be bored to their normal diameters and so that their abutments have normal positional relation; and in any case when either the diameter of the bore or the position of any abutment is required to differ from normal by any predetermined amount, a corresponding change in the position of the tool can be insured by movement of one of the stops H, H⁰ by means of the screw G or G⁰ and the graduations $f^2$ or $f^{20}$.

For example, the lens mounting M shown in Figure 1 attached to the spindle B by means of the screw chuck N contains cells $m^1$, $m^2$, $m^3$, $m^4$ screwed together in the ordinary way and adapted to receive four glasses composing the complete lens. The tool $c^8$ is in position (determined by screw D⁰ and the engagement of one of the catches H⁰ with the lateral projection $e^{60}$ on one of the adjustable rings $e^{20}$ on the stop drum E⁰ attached to said screw D⁰) for boring the cell $m^4$ to its normal diameter. With this object the scale $f^{20}$ on the moveable plate F⁰, co-operating with the screw D⁰, is set at zero. The tool $c^8$ is also in position (determined by the screw D and the engagement of one of the catches H with the lateral projection $e^6$ on a ring $e^2$ of the stop drum E, attached to said screw D) for forming the abutment $m^8$ in its normal position. For this purpose the scale $f^2$ on the plate F co-operating with the screw D is set to zero. After finishing the bore $m^4$ and abutment $m^8$, the tool $c^7$ may be similarly positioned (by means of other catches H, H⁰ and rings $e^2$, $e^{20}$ co-operating with the screws D and D⁰) to finish the bore $m^3$ and the abutment $m^7$, and during this operation the cell with bore $m^4$ and abutment $m^8$ may remain in the mount M or otherwise, as may be convenient. In similar manner the tools $c^6$ and $c^5$ may be positioned and used respectively for finishing the cells $m^2$ and $m^1$ with their abutments $m^6$ and $m^5$.

In order to ensure that the various cells are bored and their abutments formed truly to one common axis, it is desirable that they should all be bored in their own mounting and supported thereby as they are to be supported when in use. But we do not limit ourselves to this arrangement.

In any case in which, owing to abnormality of a glass or glasses, the diameter of a cell or the position of its abutment is required to be abnormal, then, in using the apparatus as above described, instead of setting the scales $f^2$, $f^{20}$ to zero, they are set to read the amount of the abnormality required. We employ a plurality of tools as shown in Figure 1 either in order to minimize the effect of wear of the tool in cases where a large number of lens mounts of one kind are to be finished in succession, or where, owing to the intricacy of design of the mounting, the tools are most conveniently of different forms. For example, the tools $c^5$ and $c^6$ are hooked in order that they may reach into the cells $m^1$ and $m^2$.

In cases where only a few lens mounts have to be finished so that the wear on the tool is slight, a single tool, and not a plurality, may be used and successively positioned for boring the different cells by means of various catches H, H⁰ and lateral projections on the stop drum rings.

Previous to the operation of this machine, the various cells such as $m^1$, $m^2$, $m^3$, $m^4$ may have been formed approximately to size, and their abutments approximately to correct position, and the machine may be used only to correct or adjust these elements and provide for abnormalities. Alternatively, the cells may have been prepared so that the whole work of forming the abutments and the bores is done by the machine.

In other cases the bores of the cells may have been finished beforehand, and the machine may be used for correcting or adjusting the positions of the abutments only.

Alternatively, instead of the above means for setting a tool transversely according to any variation of the diameter of a lens from the normal diameter, the body of the slide rest C may be provided with means by which such variation of a lens to be mounted may be used directly to effect a corresponding transverse setting of the tool for boring the setting to receive said lens. Such means may include, for example, a jaw or abutment $c^4$ fixed to the upper or transverse slide of the slide rest C, and a jaw K on a lever L pivoted at $l$ to the same slide of the rest. At a point $l^1$ (at a distance from $l$ which is one-half of that between $l$ and the operative point of the jaw K) is pivoted, a rod $l^2$ sliding in a hole in the upper member of the slide rest capable of being clamped therein by means of an eye-bolt $l^3$ and nut $l^4$, and being screwed rigidly into the nut $d$ by which the cross slide screw D⁰ operates the slide, and which, for this purpose, has limited movement under the action of the rod $l^2$ in guideways under the upper member of the rest. The drum E⁰ having been so set by means of its stops that the boring tool occupies the position proper for boring a setting of normal diameter, the nut $l^4$ is loosened, the lens to be mounted, is placed against the jaw $c^4$ and the lever L is turned until the jaw K touches the other side of the lens, and the rod $l^2$ and the nut $d$ are then clamped by means of the nut $l^4$, thereby effecting automatically such transverse setting of the turning tool in relation to the nut $d$ as is necessary to bore the setting to fit the lens. The nut $l^4$ should be tightened before the setting is bored.

The new method may be carried out independently of the particular apparatus shown in the drawings and many changes may be made in the arrangement and the parts of the particular apparatus shown without departing from the apparatus features of the invention.

What is claimed is:

1. The method of mounting a plurality of lens systems which are nominally alike, so as to accommodate for variations in the component lenses of the systems, which consists in measuring the focal lengths of the lenses composing each system, determining from such measurements the positional relations of the abutment surfaces of the setting necessary to secure the best results from a combination of the component lenses of each system, forming the said surfaces in such predetermined positional relations, and then mounting the lenses in the settings so formed.

2. The method of mounting a plurality of lens systems which are nominally alike, so as to accommodate the variations in the component lenses, which consists in determining by measurement the departures from normal of the focal lengths of the lenses of each system, determining from such measurements the variations from normal in the positional relations of the abutment surfaces of the settings necessary to secure the best results from a combination of the lenses of each system, forming said surfaces at such predetermined variation from their normal positional relation, and then mounting the lenses in the settings so formed.

3. The method of mounting a plurality of lens systems which are nominally alike, so as to accommodate for variations in the component lenses of the systems, which consists in measuring the focal lengths and the thicknesses of the lenses composing each system, determining from such measurements the positional relations of the abutment surfaces of the setting necessary to secure the best results from a combination of the component lenses of each system, forming the said surfaces in such predetermined positional relations, and then mounting the lenses in the settings so formed.

4. The method of mounting a plurality of lens systems which are nominally alike, so as to accommodate the variations in the component lenses, which consists in determining by measurement the departures from normal of the thicknesses and the focal lengths of the lenses of each system, determining from such measurements the variations from normal in the positional relations of the abutment surfaces of the settings necessary to secure the best results from a combination of the lenses of each system, forming said surfaces at such predetermined variation from their normal positional relation, and then mounting the lenses in the settings so formed.

5. The method of mounting a plurality of lens systems which are nominally alike, so as to accommodate for variations in the component lenses, which comprises measuring the variations from normal of the diameters of the lenses of each system, determining from such measurements the variations from normal in the diameters of the respective settings necessary to secure the best results from a combination of the lenses of each system, boring the settings respectively to such predetermined abnormal diameters, and mounting the lenses in the settings so formed.

6. Apparatus for adjusting the settings of a lens mounting, comprising a spindle for rotating a setting about its axis, a slide to which a plurality of tools adapted to form the abutments upon the settings of the mounting is secured, means for arresting the movement of said slide comprising two sets of cooperating stops, means for adjusting the stops of one set so as to arrest the movement of said slide when each of said tools is in normal position, means for locking the stops of said set in adjusted position, means for adjustably moving the stops of the other set so as to arrest the movement of said slide when any of said tools is at a predetermined distance from its normal position, and a scale cooperating with said second set of stops to indicate such predetermined distance.

7. Apparatus for adjusting the settings of a lens mounting, comprising a spindle adapted to rotate a setting about its axis, a slide to which a tool adapted to form an abutment upon the setting is secured, a screw for moving said slide, a ring rotatably mounted upon said screw, a stop upon said ring, means for locking said ring to said screw with its stop in adjusted position, a plate rotatably mounted coaxially with said screw, means for rotating said plate independently of said screw, and a stop mounted on said plate and movable into and out of position to come into contact with the stop on said ring.

8. Apparatus for adjusting the settings of a lens mounting, comprising a spindle adapted to rotate a setting about its axis, a slide to which a plurality of tools adapted to form abutments upon the settings of said mounting are secured, a screw for moving said slide, a drum upon said screw, a plurality of rings rotatably mounted upon said drum, a stop upon each of said rings, means for locking said rings with said stops in adjusted position, a plate rotatably mounted coaxially with said screw, means for rotating said plate independently of said screw, and a plurality of stops mounted on said plate and independently movable into and out of position to come into contact with the stops on said rings.

9. Apparatus for adjusting the settings of a lens mounting, comprising a fixed bed, a spindle for rotating a setting about its axis, a carriage for a tool adapted to form an abutment upon said setting, a slide upon which said carriage is slidably mounted, said slide being adapted to move upon said bed in a direction at right angles to that upon which said carriage moves upon said slide, a pair of cooperating independently adjustable stops to arrest the movement of said carriage with respect to said slide, and a pair of cooperating independently adjustable stops to arrest the movement of said slide with respect to said bed.

In testimony whereof, we have hereunto set our hands, in the presence of two subscribing witnesses.

WILLIAM TAYLOR.
ARTHUR WARMISHAM.

Witnesses:
ERNEST R. MALTBY,
HEDLEY A. SEVILLE.